Figure 11:
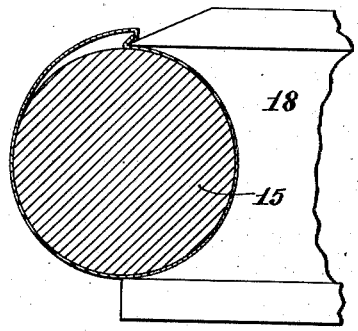

T. A. EDISON & J. F. OTT.
TUBE FORMING MACHINE.
APPLICATION FILED OCT. 17, 1905.
967,178.
Patented Aug. 16, 1910.
5 SHEETS—SHEET 1.
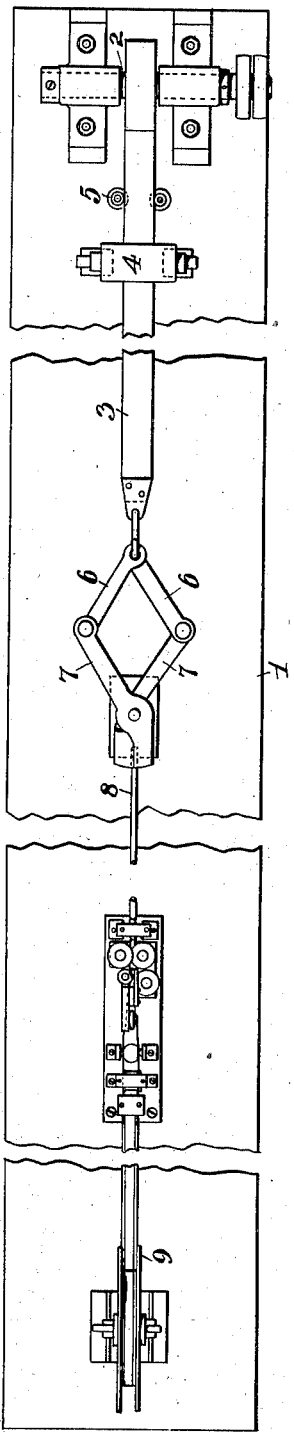
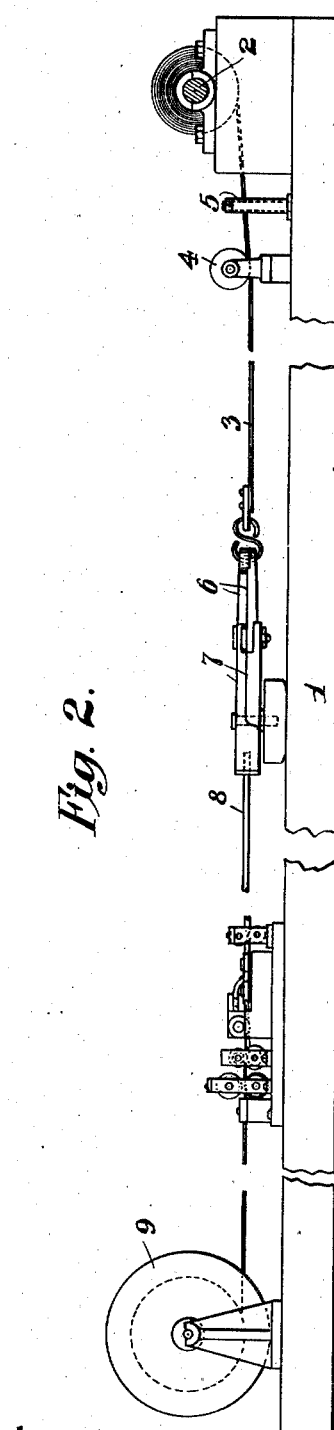

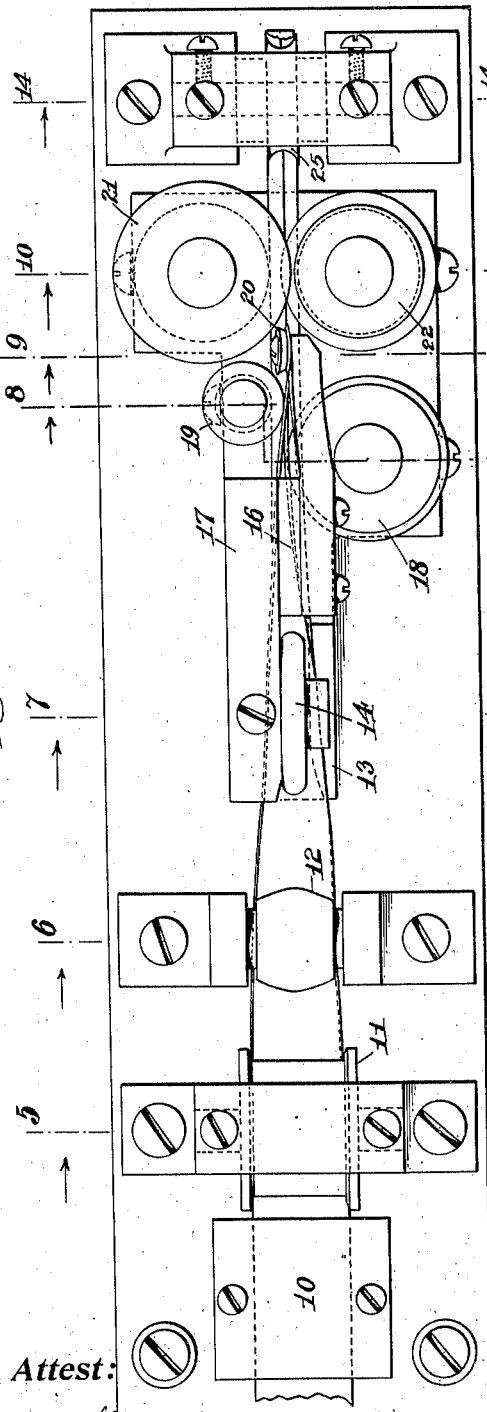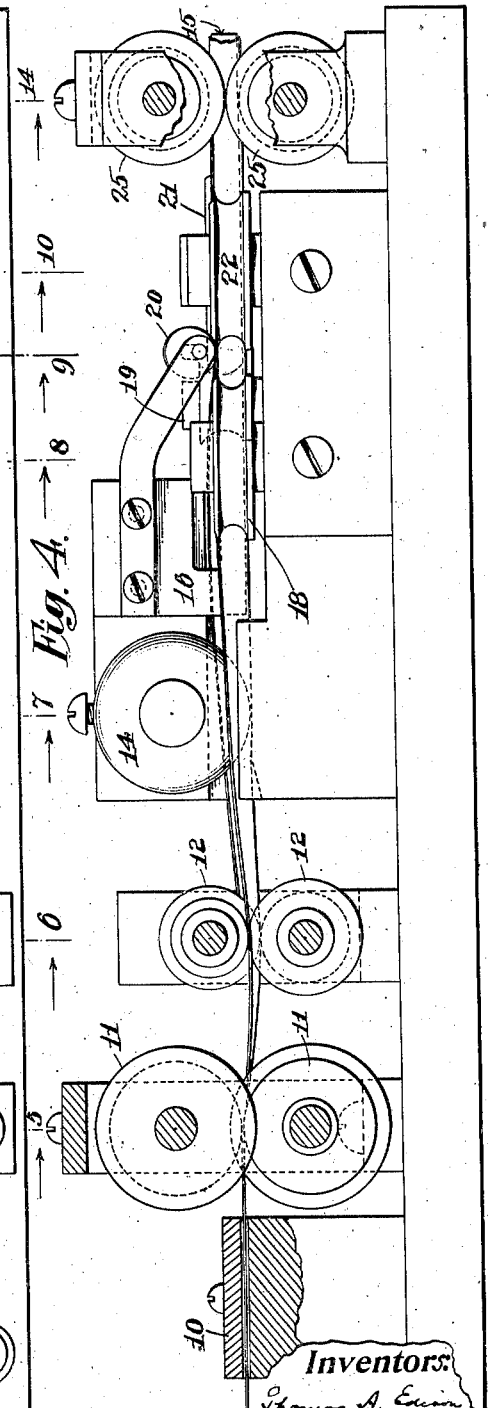

T. A. EDISON & J. F. OTT.
TUBE FORMING MACHINE.
APPLICATION FILED OCT. 17, 1905.
967,178.
Patented Aug. 16, 1910.
5 SHEETS—SHEET 3.
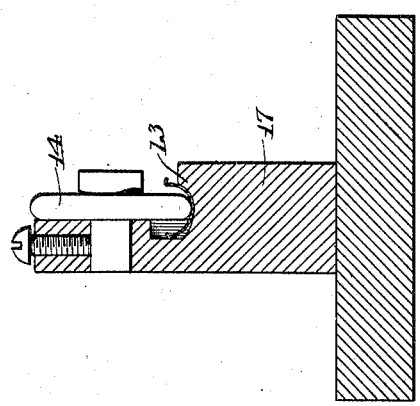
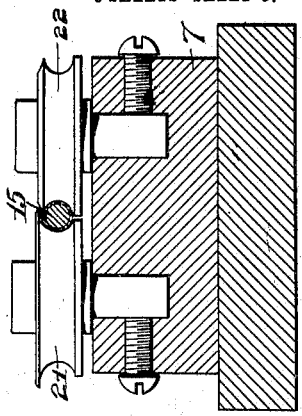
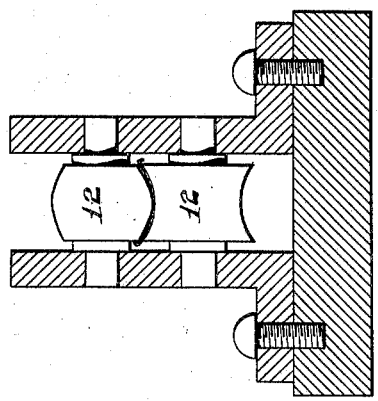
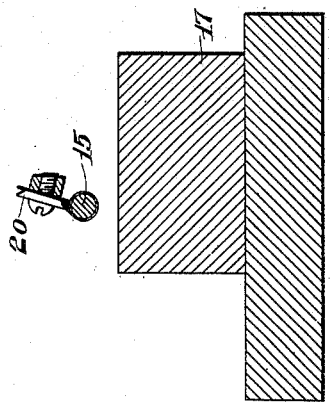
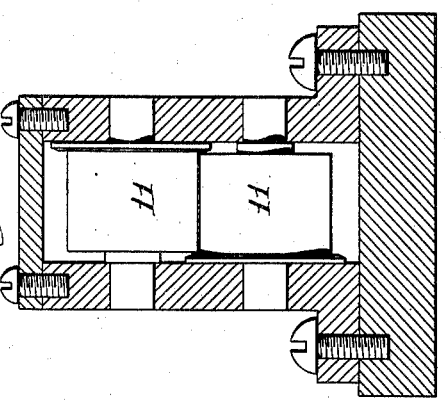
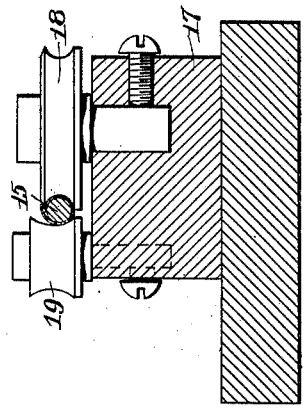
Attest:
Edgeworth Greene
Delos Holden
Inventors:
Thomas A. Edison
John F. Ott
by Frank L. Dyer, Atty.

T. A. EDISON & J. F. OTT.
TUBE FORMING MACHINE.
APPLICATION FILED OCT. 17, 1905.

967,178.

Patented Aug. 16, 1910.
5 SHEETS—SHEET 4.

Attest:
Delos Holden
Iving C. MacArthur

Inventors
Thomas A. Edison
John F. Ott
by
Frank L. Dyer, Atty.

T. A. EDISON & J. F. OTT.
TUBE FORMING MACHINE.
APPLICATION FILED OCT. 17, 1905.
967,178.
Patented Aug. 16, 1910.
5 SHEETS—SHEET 5.
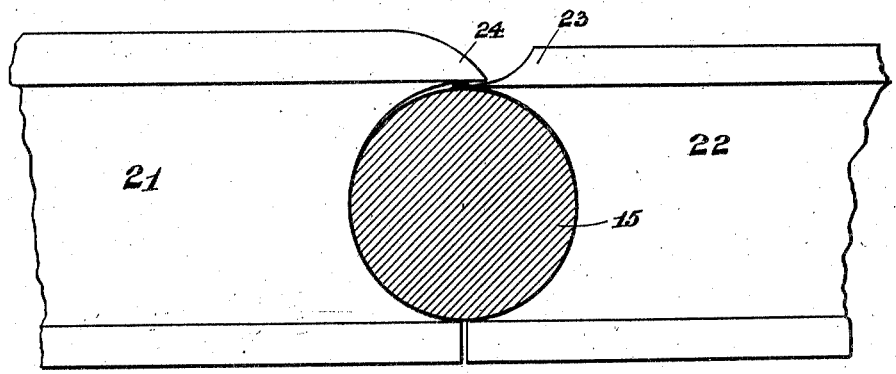
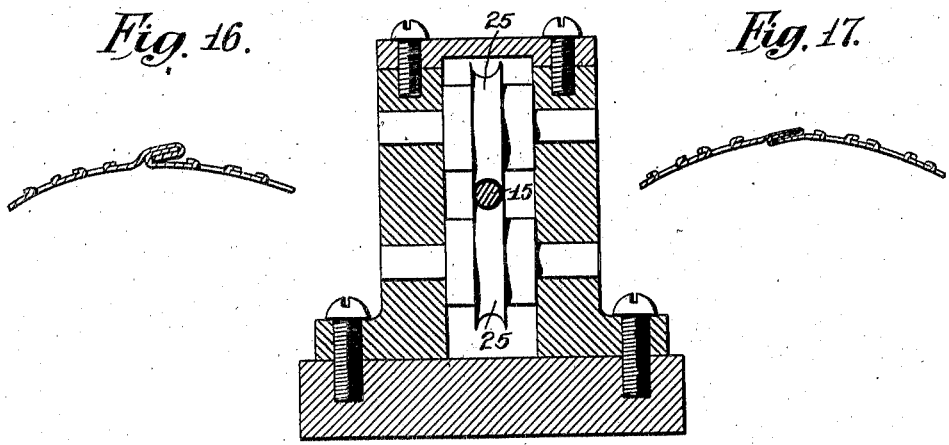
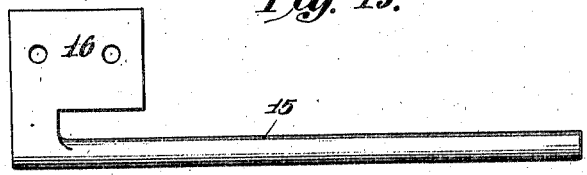
Attest:
Edgeworth Greene
Delos Holden
Inventors:
Thomas A. Edison
John F. Ott
by Frank L. Dyer Atty.

UNITED STATES PATENT OFFICE.

THOMAS A. EDISON, OF LLEWELLYN PARK, ORANGE, AND JOHN F. OTT, OF ORANGE, NEW JERSEY.

TUBE-FORMING MACHINE.

967,178.  Specification of Letters Patent.  Patented Aug. 16, 1910.

Application filed October 17, 1905. Serial No. 283,115.

*To all whom it may concern:*

Be it known that we, THOMAS ALVA EDISON, a citizen of the United States, and a resident of Llewellyn Park, Orange, in the county of Essex and State of New Jersey, and JOHN F. OTT, a citizen of the United States, and a resident of Orange, in the county of Essex and State of New Jersey, have invented certain new and useful Improvements in Tube-Forming Machines, of which the following is a description.

Our invention relates to an improved machine for forming continuous tubes from sheet metal strips, and the invention has been designed particularly for the purpose of forming continuous tubes from strips of perforated sheet iron or steel with imperforate edges, which tubes are adapted to be cut up into short sections filled with active material and used in the make-up of storage battery electrodes of the type employing an alkaline electrolyte. It will, however, be understood that the improved machine may, of course, be used for making continuous tubing for other purposes and that the strips employed may be perforated or not.

Our object is to provide a machine of simple construction, by which the tubes in question may be formed with a very strong double-lapped seam, so as to be able to effectively resist the bulging strains to which the tubes will be subjected in packing active material therein, and resulting from the tendency of the active material to swell when in use.

The machine is simple in construction and is of such a character that when the material is properly introduced within the same, the resulting tubes will be necessarily perfect throughout.

The invention consists, first, in the combination of several forming dies and rollers by which the strip will be properly and progressively manipulated to be bent into tubular form and simultaneously to produce and complete the seam; and second, in the combination with such dies and forming rollers of appropriate means for moving the strip with respect to the same, all as we shall hereinafter more fully set forth and claim.

In order that the invention may be better understood, attention is directed to the accompanying drawing, forming part of this specification and in which—

Figure 12:
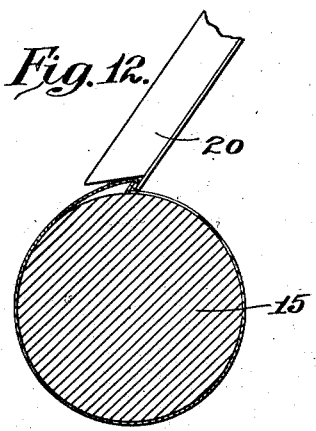
Figure 18:
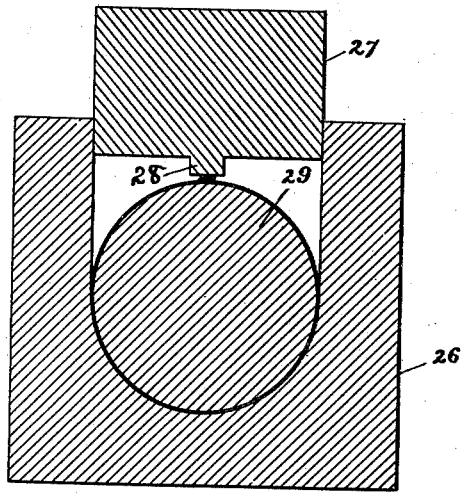

Figure 1 is a plan view of the complete apparatus, showing the preferred means for moving the strip progressively with respect to the forming dies; Fig. 2, a side elevation of the same; Fig. 3, an enlarged plan view of the forming dies, showing the strip being operated upon; Fig. 4, a side elevation of the same partly in section; Fig. 5, a cross-sectional view on the line 5—5 of Fig. 3. Fig. 6, a similar view on the line 6—6 of Fig. 3. Fig. 7, a similar view on the line 7—7 of Fig. 3. Fig. 8, a similar view on the line 8—8 of Fig. 3. Fig. 9, a similar view on the line 9—9 of Fig. 3; Fig. 10, a similar view on the line 10—10 of Fig. 3; Fig. 11, a cross-sectional view on a greatly enlarged scale showing one of the rollers and mandrel, illustrated on a small scale in Fig. 8; Fig. 12, a cross-sectional view on a similar scale showing the engaging roller and mandrel illustrated on a small scale in Fig. 9; Fig. 13, a cross-sectional view on a similar scale showing the coöperating rollers for performing the intermediate seaming operation, illustrated on a small scale in Fig. 10; Fig. 14, a cross-sectional view of the compressing rollers and mandrel on the line 14—14 of Fig. 3; Fig. 15, a separate view of the mandrel; Fig. 16, an enlarged sectional view showing part of the tube with the seam in a partially finished condition, after leaving the intermediate seaming rollers; Fig. 17, a similar view of the same, showing the finished seam after leaving the compression rollers; Fig. 18, a cross-sectional view of the seam pressing dies for the separate tube sections; and, Fig. 19, a similar view showing the finished joint.

In all of the above views, corresponding parts are represented by the same numerals of reference.

The apparatus comprises preferably a long flat table 1, at one end of which the mechanism for moving the strip relatively to the forming mechanism is situated. Said mechanism comprises, preferably, a winch 2, operated either by hand or by power, and around which is wound a flat belt 3 adapted to be coiled up on the winch and guided by the horizontal roller 4 and vertical rollers 5. The free end of the belt 3 is connected by links 6—6 to a pair of grippers 7, for engaging the forward end of the tube 8 and moving the same longitudinally of the table, forming a length of tube which is cut off for subsequent division into sections of the required size. In this movement along the table, the grippers 7 are supported by a substantially flat shoe, as shown, so as to prevent sagging at the free end of the forming tube. With the mechanism described, it will be obvious that the operation of forming the tubes will be performed intermittently, a section being drawn off along the table 1 by the operation of the winch, which section is cut off and the grippers are again engaged with the tube to repeat the operation. It will be understood, of course, that mechanism for feeding the tube continuously may be employed, instead of the intermittently operating mechanism described.

Figure 19:
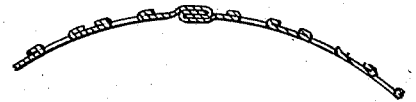

The strip which is to be shaped into tubular form, is carried on a reel 9 and passes between forming rollers and dies, illustrated in Figs. 3 to 15, inclusive, to which attention is directed. First, the strip passes through a guide block 10 by which it will be kept in perfect alinement, and thence between edging rolls 11—11, by which one edge of the strip will be bent upward and the other edge downward, as shown in Fig. 5. From these edging rolls, the strip passes between bending rolls 12—12 (see Fig. 6) by which the strip will be given its first bend, leaving these rolls in the form of a shallow trough of slight concavity. The strip now passes over a bending die 13, being held in position thereon by a roller 14 and being brought to a substantially semi-circular cross-section (see Fig. 7). After leaving the bending die 13, the strip passes over a mandrel 15, the head or support 16 of which is secured to the block 17, which carries the roller 14, and the several seam forming rolls and dies to be described. Immediately after the strip reaches the mandrel 15, it passes into contact with the roll 18, whose upper edge (Fig. 11) is formed to accurately receive the adjacent down turned edge of the strip. Immediately thereafter, the strip encounters the roll 19 and is given a further bend, so as to overlap the edges. The strip next encounters the engaging roll 20 (Fig. 12) having a creased or grooved periphery and which squeezes the up-turned edge slightly back on itself to commence the seam, this operation taking place over the mandrel 15, as shown. While still surrounding the mandrel and with the edges loosely engaged together, the strip encounters the opposed intermediate seaming rollers 21 and 22, the latter being provided with a sharp edge 23 (Fig. 13), which tucks the upturned edge of the strip inwardly within the down-turned edge thereof, the seam being held against the overhanging edge 24 of the roll 21. After leaving these rolls, the appearance of the seam will be as shown in Fig. 16. The substantially finished tube now passes the rolls 25 (see Fig. 14) and the seam is compressed while the tube is still encircling the mandrel 15 and results in the seam being tightly flattened and closed, as shown in Fig. 17. Preferably the seam is subjected to a further and extremely great pressure after being cut into section of the desired length in order that the seam may be brought into line with the body of the tube, as shown in Fig. 19, and at the same time more effectively flattened and consolidated than would be so readily possible by the use of rolls. This further pressure is applied by means of coöperating dies 26 and 27, the latter being provided with a bead 28, which engages the seam, and during the pressure the tube section is received on a separate mandrel 29. When thus engaged, the dies 26 and 27 are pressed strongly together by a hydraulic press or in any other convenient way. Such a seam is very strong and has been found in practice to effectively resist disrupting strains encountered in tightly packing active material in the tube sections, and resulting also, from the tendency of the active material to swell in use.

Having now described our invention, what we claim as new and desire to secure by Letters Patent is as follows:

1. In tube forming apparatus, the combination of rolls for bending the edges of a moving strip in opposite directions, means for bending the strip into tubular form, means for engaging together the overturned edges of said strip, and means comprising a smooth cylindrical mandrel and a pair of rolls coöperating therewith and with each other for continuously tucking in the outer of said edges upon the inner edge, substantially as and for the purposes set forth.

2. In tube forming apparatus, the combination of rolls for bending the edges of a moving strip in opposite directions, means for bending the strip into tubular form, means for engaging together the overturned edges of said strip, means comprising a smooth cylindrical mandrel and a pair of rolls coöperating therewith and with each other for continuously tucking in the outer of said edges upon the inner edge, and means for finally applying pressure to said engaged edges, as and for the purposes set forth.

3. In tube forming apparatus, the combination with means for bending the edges of a moving strip in opposite directions and means for bending said strip into tubular form, of a grooved roller for simultaneously engaging one of said turned edges over upon the other turned edge and for applying a squeezing pressure to the former, substantially as and for the purposes set forth.

4. In tube forming apparatus, the combination with means for bending the edges of a moving strip in opposite directions and means for bending said strip into tubular form, of a grooved roller for simultaneously engaging one of said turned edges over upon the other turned edge and for applying a squeezing pressure to the former, and intermediate seaming rollers for continuing the pressure applied to said engaged edges, substantially as and for the purposes set forth.

5. In tube forming apparatus, the combination with means for bending the edges of a moving strip in opposite directions, means for bending said strip into tubular form, of a grooved roller for simultaneously engaging one of said turned edges over upon the other turned edge, and for applying a squeezing pressure to the former, intermediate seaming rollers for continuing the pressure applied to said engaged edges, and compressing rollers for applying the final pressure to the moving tube, substantially as set forth.

6. In a tube forming machine, the combination of a table, a gripper comprising a parallel motion device adapted to clamp the end of the material to be treated and provided with a shoe resting upon said table, and means for imparting a progressive movement to said gripper comprising a flexible connection, means for guiding the same, and means for reeling the same, substantially as set forth.

7. In a tube forming apparatus, the combination of means for progressively bending a continuously moving strip into tubular form, means comprising a cylindrical mandrel of uniform diameter throughout its length and having an unbroken periphery and rollers coöperating therewith and with each other for overlapping and uniting the edges of the strip in its movement, and means for continuously moving the strip forwardly throughout all the operations performed upon it, substantially as set forth.

8. In a tube forming apparatus, the combination of means for progressively bending a continuously moving strip into tubular form, a cylindrical mandrel, an inclined roller 20 having a creased periphery for performing the initial operation upon the seam, and means for imparting a progressive movement to said strip including a gripper provided with a shoe adapted to slide upon a suitable support, substantially as set forth.

9. In a tube forming apparatus, the combination of means for progressively bending a continuously moving strip into tubular form, a cylindrical mandrel for receiving said tube and rollers 21 and 22 coöperating with each other and with the mandrel for tucking the seam, substantially as set forth.

This specification signed and witnessed this 16th day of October, 1905.

THOS. A. EDISON.
           JOHN F. OTT.

Witnesses:
    FRANK L. DYER,
    DELOS HOLDEN.